US012731824B2

(12) United States Patent
Michishita et al.

(10) Patent No.: US 12,731,824 B2
(45) Date of Patent: Sep. 8, 2026

(54) CONTROL DEVICE AND CONTROL METHOD

(71) Applicant: HONDA MOTOR CO., LTD., Tokyo (JP)

(72) Inventors: Takanori Michishita, Tokyo (JP); Daichi Ishida, Tokyo (JP); Masaomi Sato, Tokyo (JP); Shinji Takuno, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 38 days.

(21) Appl. No.: 18/823,763

(22) Filed: Sep. 4, 2024

(65) Prior Publication Data

US 2025/0079553 A1 Mar. 6, 2025

(30) Foreign Application Priority Data

Sep. 6, 2023 (JP) ................................ 2023-144850

(51) Int. Cl.
*B60L 58/26* (2019.01)
*B60L 58/18* (2019.01)
(Continued)

(52) U.S. Cl.
CPC ........... *H01M 10/633* (2015.04); *B60L 58/18* (2019.02); *B60L 58/26* (2019.02); *H01M 10/613* (2015.04);
(Continued)

(58) Field of Classification Search
CPC ............. H01M 10/633; H01M 10/613; H01M 10/625; H01M 10/6567; H01M 10/663;
(Continued)

(56) References Cited

U.S. PATENT DOCUMENTS 4,229,687 A * 10/1980 Newman ............... H01M 10/44 320/DIG. 34
4,385,269 A * 5/1983 Aspinwall ............... H02J 7/963 320/152

(Continued)

FOREIGN PATENT DOCUMENTS

CN 112582712 A * 3/2021 .......... H01M 16/006
CN 112615087 A * 4/2021 .......... H01M 16/006

(Continued)

OTHER PUBLICATIONS

"IoT based Lithium-Ion Battery Monitoring System in Electric Vehicle;" Vijaya et al., 2023 Third International Conference on Artificial Intelligence and Smart Energy (ICAIS) (2023, pp. 1092-1096); Feb. 2, 2023. (Year: 2023).*

(Continued)

*Primary Examiner* — Khoi H Tran
*Assistant Examiner* — Jorge O Peche
(74) *Attorney, Agent, or Firm* — Amin, Turocy & Watson, LLP

(57) ABSTRACT

A control device for a vehicle that includes a rotating electric machine for driving a vehicle, a power storage device configured to transmit and receive electric power to and from the rotating electric machine, and a cooling device configured to cool the power storage device. The control device includes a processor configured to execute a program to acquire a temperature of the power storage device after charging of the power storage device by an external power source is completed, and to control an operation of the cooling device on a basis of a comparison result between the acquired temperature and a threshold temperature set as a condition for activating the cooling device after charging of the power storage device is completed. The threshold temperature is lower than another threshold temperature during (Continued)

charging set as a condition for activating the cooling device while the power storage device is being charged.

10 Claims, 5 Drawing Sheets

(51) Int. Cl.
*H01M 10/613* (2014.01)
*H01M 10/625* (2014.01)
*H01M 10/633* (2014.01)
*H01M 10/6567* (2014.01)
*H01M 10/663* (2014.01)

(52) U.S. Cl.
CPC ..... *H01M 10/625* (2015.04); *H01M 10/6567* (2015.04); *H01M 10/663* (2015.04); *B60L 2240/545* (2013.01); *H01M 2220/20* (2013.01)

(58) Field of Classification Search
CPC ........... H01M 2220/20; H01M 10/486; H01M 10/651; B60L 58/18; B60L 58/26; B60L 2240/545; B60L 58/13; B60L 58/16
See application file for complete search history.

(56) References Cited

U.S. PATENT DOCUMENTS 4,755,735 A * 7/1988 Inakagata ............... H02J 7/977 320/DIG. 13
5,490,572 A * 2/1996 Tajiri ................ H01M 10/6563 180/68.5
5,569,520 A * 10/1996 Bates .................. H01M 4/0447 429/162
6,087,036 A * 7/2000 Rouillard .......... H01M 10/6555 429/66
6,099,986 A * 8/2000 Gauthier ............. H01M 50/574 429/7
6,475,680 B1 * 11/2002 Arai .................. H01M 10/4235 429/336
6,624,615 B1 * 9/2003 Park ........................ B60L 53/11 320/150
6,664,006 B1 * 12/2003 Munshi ................... H01M 4/13 429/234
6,902,847 B1 * 6/2005 Yata .................. H01M 10/0468 429/162
7,642,001 B2 * 1/2010 Yata .................... H01M 10/647 429/61
10,044,211 B2 * 8/2018 Seo .......................... B60L 3/12
10,286,805 B2 * 5/2019 Eun .......................... H02J 7/00
2002/0045091 A1 * 4/2002 Kamei ................ H01M 50/494 429/62
2005/0282065 A1 * 12/2005 Kubo ................ H02J 7/007192 429/62
2007/0298316 A1 * 12/2007 Yamamoto .......... H01M 10/486 429/62
2009/0099800 A1 * 4/2009 Ishishita ............... B60L 3/0046 702/63
2009/0274934 A1 * 11/2009 Muramatsu ......... H01M 8/0432 429/429
2011/0066310 A1 * 3/2011 Sakai ........................ B60L 7/16 701/22
2012/0261397 A1 * 10/2012 Schwarz ............. H01M 10/625 219/202
2014/0091772 A1 * 4/2014 Del Core ................ B60L 58/26 320/167
2014/0176024 A1 * 6/2014 Butzmann ............... B60L 50/51 307/10.1
2015/0318582 A1 * 11/2015 Brockman .......... H01M 10/425 320/137
2015/0318724 A1 * 11/2015 Brockman .......... H01M 10/482 320/152
2015/0318725 A1 * 11/2015 Brockman .......... H01M 10/486 320/162
2016/0001719 A1 * 1/2016 Frost ....................... B60L 53/14 307/20
2018/0093583 A1 * 4/2018 Kim ....................... H02J 7/0048
2018/0154793 A1 * 6/2018 Jun .................... B60H 1/00778
2018/0290552 A1 * 10/2018 Chen ...................... H02J 7/0029
2019/0067755 A1 * 2/2019 Kim .................... H01M 10/425
2019/0379030 A1 * 12/2019 Golubkov ............. B60L 3/0046
2020/0212514 A1 * 7/2020 Jin ....................... H01M 10/482
2020/0238788 A1 * 7/2020 Wu ..................... H01M 10/637
2020/0338959 A1 * 10/2020 Carlson .............. B60H 1/00921
2021/0004066 A1 * 1/2021 He .......................... G06F 1/324
2022/0072928 A1 * 3/2022 Johnston ............ B60H 1/00899
2022/0161682 A1 * 5/2022 Byrhult ................... B60L 58/25
2024/0116494 A1 * 4/2024 Ruppel ..................... F24F 11/63
2024/0300283 A1 * 9/2024 Asada .................. B60H 1/0073
2025/0026239 A1 * 1/2025 Yaguchi ................ B60W 10/26
2025/0079553 A1 * 3/2025 Michishita .............. B60L 58/26

FOREIGN PATENT DOCUMENTS

CN 114335791 A * 4/2022
CN 115476733 A * 12/2022 .............. B60L 58/12
CN 108162892 B * 3/2023 .............. B60L 58/12
CN 111055698 B * 3/2023 .......... H01M 8/0432
DE 102011080512 A1 * 2/2013 .......... H01M 10/486
DE 102018206256 A1 * 10/2018 .............. B60L 58/10
FR 3153945 A1 * 4/2025 .............. B60L 58/12
JP 2004-088985 3/2004
JP 6217618 10/2017

OTHER PUBLICATIONS

"Effective Battery Cooling System for Electric Vehicle;" Govindharaj et al., 2022 2nd International Conference on Advance Computing and Innovative Technologies in Engineering (ICACITE) (2022, pp. 1844-1848); Apr. 28, 2022. (Year: 2022).*
"Battery Thermal Management System for Electric Vehicle Using Labview;" Mohandass et al., 2024 International Conference on IoT Based Control Networks and Intelligent Systems (ICICNIS) (2024, pp. 586-592); Dec. 17, 2024. (Year: 2024).*
CN 114335791 A—machine translation (Year: 2022).*

* cited by examiner

CONTROL DEVICE AND CONTROL METHOD

CROSS-REFERENCE TO RELATED APPLICATION

Priority is claimed on Japanese Patent Application No. 2023-144850, filed Sep. 6, 2023, the content of which is incorporated herein by reference.

BACKGROUND OF THE INVENTION

Field of the Invention

The present invention relates to a control device and a control method.

Description of Related Art

In recent years, in order to ensure access to affordable, reliable, sustainable, and advanced energy for more people, research and development has been carried out on secondary batteries that contribute to energy efficiency. For example, suppressing increase in the temperature of the battery is known as a measure for suppressing deterioration of a battery mounted on an electric vehicle and extending its lifetime. For example, in an electric vehicle having a cooling fan for cooling a battery, a method in which the operation of the cooling fan is determined to prevent the battery from becoming too hot while the vehicle is in operation is known (see Japanese Patent No. 6217618). In addition to this, a method in which the operation of a cooling fan is determined on the basis of a result of comparing a battery temperature during charging with a reference temperature is known (see Japanese Unexamined Patent Application, First Publication No. 2004-88985).

SUMMARY OF THE INVENTION

In technology relating to secondary batteries, a state of health (SOH) of a battery is used as an index relating to the lifetime of the battery. In order to keep this SOH high, it is important to control the average temperature over the entire use period of time of the battery (lifetime temperature). In the related art, attempts have been made to suppress an increase in battery temperature while the vehicle is traveling or while the battery is being charged. However, there was no known method for suppressing an increase in battery temperature during periods other than while the vehicle is traveling or while the battery is being charged. In particular, a vehicle may be left unattended with the charging gun engaged for a relatively long period of time after charging of the battery is completed, and in summer or in areas where the average annual temperature is high, the battery temperature may increase during this period of time when the battery is left unattended after charging.

The present invention has been made in consideration of such circumstances, and an object of the present invention is to provide a control device and a control method in which it is possible to suppress deterioration of a battery by controlling a temperature of the battery after charging of the battery is completed. This in turn contributes to energy efficiency.

A control device and a control method according to the present invention employ the following configuration.

(1) A control device according to one aspect of this invention is a control device for a vehicle that includes a rotating electric machine for driving a vehicle, a power storage device configured to transmit and receive electric power to and from the rotating electric machine, and a cooling device configured to cool the power storage device. The control device includes a processor configured to execute a program to acquire a temperature of the power storage device after charging of the power storage device by an external power source is completed, and to control an operation of the cooling device on a basis of a comparison result between the acquired temperature and a threshold temperature set as a condition for activating the cooling device after charging of the power storage device is completed. The threshold temperature is lower than another threshold temperature during charging set as a condition for activating the cooling device while the power storage device is being charged.

Regarding an aspect of (2), in the control device according to the above aspect of (1), the threshold temperature is a fixed temperature for achieving a predetermined target value set for performance of the power storage device.

Regarding an aspect of (3), in the control device according to the above aspect of (1), the processor is further configured to execute the program to calculate the threshold temperature for achieving a predetermined target value set for performance of the power storage device on a basis of a usage status of the power storage device.

Regarding an aspect of (4), in the control device according to the above aspect of (3), the processor is further configured to execute the program to calculate the threshold temperature to make an average value of the temperature of the power storage device be a target temperature when the power storage device is used for a predetermined period of time.

Regarding an aspect of (5), in the control device according to the above aspect of (3), the processor is further configured to execute the program to acquire an external temperature of the vehicle, and to calculate the threshold temperature on a basis of the acquired external temperature of the vehicle.

Regarding an aspect of (6), in the control device according to the above aspect of (1), the processor is further configured to execute the program to set the vehicle to a sleep state after charging of the power storage device is completed and then to activate the vehicle periodically, and to control an operation of the cooling device on a basis of a comparison result between a temperature of the power storage device acquired when the vehicle is periodically activated and the threshold temperature.

Regarding an aspect of (7), in the control device according to the above aspect of (1), the processor is further configured to execute the program to control charging of the power storage device by the external power source.

Regarding an aspect of (8), in the control device according to the above aspect of (7), the processor is further configured to execute the program to measure a charging rate of a second power storage device configured to supply electric power to the cooling device, and to charge the second power storage device with the electric power that is provided by the power storage device in a case in which the charging rate of the second power storage device is lower than a threshold charging rate after the cooling device completes cooling of the power storage device after charging of the power storage device is completed.

(9) A control method according to another aspect of this invention is a control method for a vehicle that includes a rotating electric machine for driving a vehicle, a power storage device configured to transmit and receive electric power to and from the rotating electric machine, and a cooling device configured to cool the power storage device. The control method includes setting, by a computer, the vehicle to a sleep state after charging of the power storage device by an external power source is completed and then activating by the computer, the vehicle periodically, acquiring by the computer, a temperature of the power storage device after charging of the power storage device is completed, and controlling by the computer, an operation of the cooling device on a basis of a comparison result between the acquired temperature and a threshold temperature set as a condition for activating the cooling device after charging of the power storage device is completed, and the threshold temperature is lower than another threshold temperature during charging set as a condition for activating the cooling device while the power storage device is being charged.

Regarding an aspect of (10), in the control method according to the above aspect of (9), the computer acquires an external temperature of the vehicle, and calculates the threshold temperature on a basis of the acquired external temperature of the vehicle.

According to the above aspects of (1) to (10), it is possible to suppress deterioration of a battery by controlling a temperature of the battery after charging of the battery is completed.

According to the above aspects of (3) to (5), it is possible to control a temperature of a battery after charging of the battery is completed with higher accuracy and suppress deterioration of the battery by calculating a variable threshold temperature according to the usage environment of the battery or the like.

DETAILED DESCRIPTION OF THE INVENTION

Hereinafter, an embodiment of a control device and a control method of the present invention will be described with reference to the drawings. The control device of the embodiment controls charging of a battery provided in an electric vehicle (hereinafter referred to as a "vehicle M"). The vehicle M is, for example, a vehicle such as a two-wheeled vehicle, a three-wheeled vehicle, or a four-wheeled vehicle, and a drive source thereof is a rotating electric machine (a motor), an internal combustion engine such as a diesel engine or a gasoline engine, or a combination of these. The rotating electric machine operates using the electric power generated by a generator connected to an internal combustion engine or the electric power discharged from a battery. Hereinafter, the vehicle M is assumed to be an electric vehicle that travels by an electric motor driven with electric power supplied from an on-board battery of a battery electric vehicle (BEV), a hybrid electric vehicle (HEV), or the like, for example.

[Vehicle M]

Figure 1:
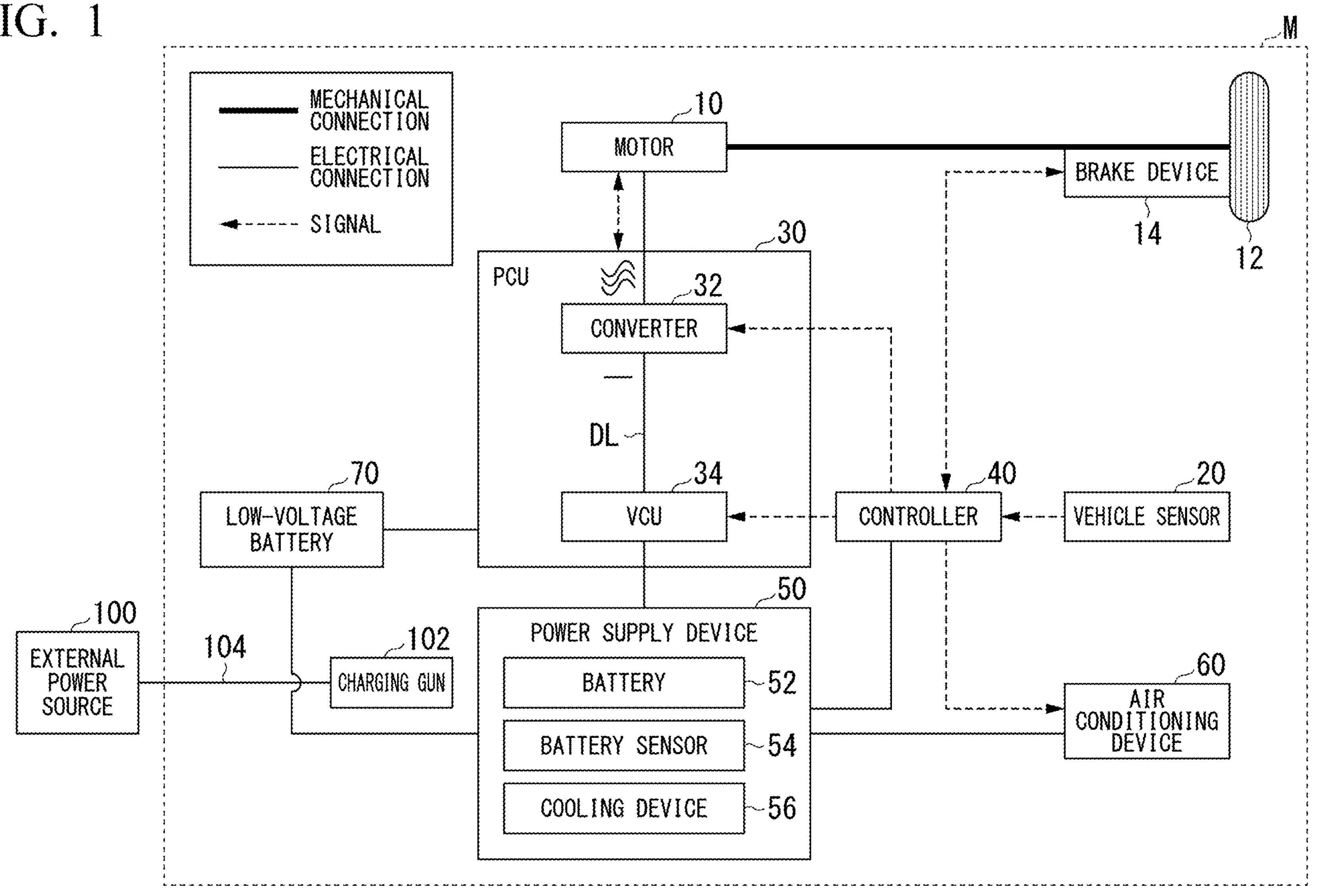
FIG. 1 is a diagram showing an example of a configuration of a vehicle M according to an embodiment.

FIG. 1 is a diagram showing an example of a configuration of the vehicle M according to the embodiment. The vehicle M includes, for example, a motor 10, a drive wheel 12, a brake device 14, a vehicle sensor 20, a power control unit (PCU) 30, a controller 40, a power supply device 50, an air conditioning device 60, and a low-voltage battery 70. The power supply device 50 includes, for example, a battery 52, a battery sensor 54, and a cooling device 56. The vehicle M is an example of a "vehicle." The motor 10 is an example of a "rotating electric machine" for driving a vehicle. The battery 52 is an example of a "power storage device" that transmits and receives electric power to and from the rotating electric machine. The cooling device 56 is an example of a "cooling device" that cools the power storage device. The low-voltage battery 70 is an example of a "second power storage device."

The motor 10 is, for example, a three-phase AC motor. A rotor of the motor 10 is connected to the drive wheel 12. The motor 10 outputs power to the drive wheels 12 using the electric power supplied from the battery 52. In addition, the motor 10 generates electricity using the kinetic energy of the vehicle when the vehicle is decelerating.

The brake device 14 includes, for example, a brake caliper, a cylinder that transmits hydraulic pressure to the brake caliper, and an electric motor that generates the hydraulic pressure in the cylinder. The brake device 14 may include a mechanism for transmitting the hydraulic pressure generated by the operation of a brake pedal to the cylinder via a master cylinder as a backup. The brake device 14 is not limited to the configuration described above and may be an electronically controlled hydraulic brake device that transmits the hydraulic pressure of the master cylinder to the cylinder.

The vehicle sensor 20 includes an accelerator opening sensor, a vehicle speed sensor, and a brake depression amount sensor. The accelerator opening sensor is attached to an accelerator pedal that receives an acceleration command from a driver. The accelerator opening sensor detects the amount of operation of the accelerator pedal and outputs the detected amount of operation to the controller 40 as the accelerator opening. The vehicle speed sensor includes, for example, wheel speed sensors attached to the wheels and a speed calculator. The vehicle speed sensor integrates the wheel speeds detected by the wheel speed sensors to derive the speed of the vehicle (the vehicle speed), and outputs the derived speed information to the controller 40. The brake depression amount sensor is attached to the brake pedal. The brake depression amount sensor detects the amount of operation of the brake pedal and outputs the detected amount of operation to the controller 40 as a brake depression amount.

The PCU 30 includes, for example, a converter 32 and a voltage control unit (VCU) 34. The converter 32 is connected between the battery 52 and the motor 10. The converter 32 converts the electric power output by the VCU 34 into electric power suitable for the motor 10 and supplies it to the motor 10. The converter 32 is, for example, an AC-DC converter. A DC side terminal of the converter 32 is connected to a DC link DL. The battery 52 is connected to the DC link DL via the VCU 34. The converter 32 converts the AC generated by the motor 10 into DC and outputs it to the DC link DL.

The VCU 34 is connected between the battery 52 and the motor 10. The VCU 34 increases or decreases the voltage of the electric power supplied from the battery 52 and outputs it to the DC link DL. The VCU 34 is, for example, a DC-DC converter.

The controller 40 controls the overall operation of the vehicle M. The controller 40 controls the motor 10 and the brake device 14 on the basis of, for example, the information output by the vehicle sensor 20. In addition, the controller 40 controls the VCU 34 in order to adjust the electric power to be supplied to the motor 10 on the basis of the information output by the vehicle sensor 20, for example. In addition, the controller 40 controls a charging process of the battery 52 by an external power source 100 and the temperature of the battery 52 (the cooling device 56) during the charging process.

Each of the functional units of the controller 40 is realized by, for example, a computer processor such as an electronic control unit (ECU) or a central processing unit (CPU) executing a program (software). Each of the functional units of the controller 40 may be realized by hardware (a circuit unit) such as a large scale integration (LSI), an application specific integrated circuit (ASIC), a field-programmable gate array (FPGA), and a graphics processing unit (GPU) or may be realized by the cooperation of software and hardware. The functions of the controller 40 may be incorporated into separate control devices, for example, a motor ECU, a brake ECU, a battery/VCU ECU, and the like. The functions of the controller 40 will be described in detail below.

The battery 52 supplies electric power to various components mounted on the vehicle M. The battery 52 is, for example, a battery pack that includes an electric power storage (not shown) that stores the electric power used for the vehicle M to travel. The battery 52 may be, for example, a cassette-type battery pack that is easily detachable from the vehicle M, or may be, for example, an installed type battery pack that is not easily detachable from the vehicle M. The power storage (not shown) included in the battery 52 is, for example, a rechargeable secondary battery such as a lithium ion battery. The secondary battery included in the battery 52 may be, for example, a capacitor such as an electric double layer capacitor, a composite battery obtained by combining a secondary battery and a capacitor with each other, or the like, in addition to a lead storage battery, a nickel hydride battery, a sodium ion battery, or the like. The battery 52 can be charged by electric power provided by the external power source 100, which is a charger external to the vehicle M. The battery 52 may be a fuel cell stack (FCS).

The battery sensor 54 measures the physical quantities, such as the current, the voltage, and the temperature of the battery 52. The battery sensor 54 includes, for example, a current sensor, a voltage sensor, and a temperature sensor. The battery sensor 54 measures the temperature of the battery 52 on the basis of the control of the controller 40, for example, and outputs information indicating the measured temperature to the controller 40. In addition, the battery sensor 54 measures the current and the voltage of the battery 52, and outputs information indicating the measured current and voltage to the controller 40.

The cooling device 56 cools the battery 52 on the basis of the control of the controller 40, for example. The cooling device 56 is, for example, a heat exchanger (a chiller) that exchanges heat between a heat medium and an air-conditioning heat medium. The heat medium is, for example, water, radiator liquid, coolant liquid, or the like. In addition, the air-conditioning heat medium is, for example, a fluorocarbon or a substitute for a fluorocarbon. The cooling device 56 may include a cooling fan or the like that supplies cooling air to the battery 52.

The air conditioning device 60 adjusts the temperature inside a passenger compartment of the vehicle M in accordance with the control of the controller 40 based on instructions input by an occupant of the vehicle M via an input interface (not shown), for example.

The low-voltage battery 70 supplies electric power to the cooling device 56. The low-voltage battery 70 is, for example, a 12 V battery. The low-voltage battery 70 may supply electric power to various other components mounted on the vehicle M.

The external power source 100 supplies electric power to the battery 52 of the vehicle M. The external power source 100 includes, for example, a charging cable 104 and a charging gun 102 connected to the charging cable 104. The charging gun 102 is connected to a charging port (not shown) provided on a body or the like of the vehicle M by an occupant or the like of the vehicle M. The external power source 100 supplies electric power to the battery 52 of the vehicle M via the charging cable 104 and the charging gun 102 to charge the battery 52. Alternatively, the charging cable may be provided on a body or the like such that it can be pulled out to the outside of the vehicle M. A first end portion of two end portions of the charging cable is fixed to the vehicle M, and a charging plug is provided at a second end of the two end portions of the charging cable 104. The charging plug is connected to a plug receptacle of the external power source 100, which is, for example, an electrical outlet for a household (a plug-in connector for wiring).

[Configuration of Controller 40]

Figure 2:
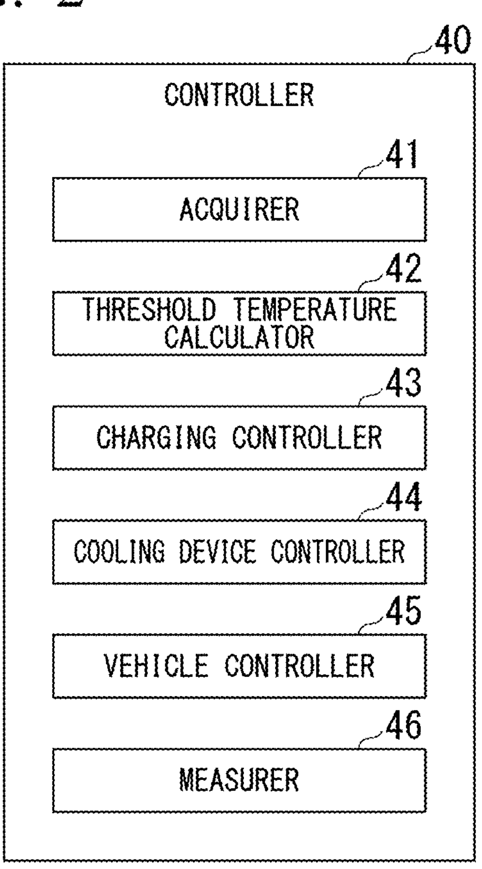
FIG. 2 is a functional block diagram showing an example of a controller 40 according to the embodiment.

FIG. 2 is a functional block diagram showing an example of the controller 40 according to the embodiment. The controller 40 includes, for example, an acquirer 41, a threshold temperature calculator 42, a charging controller 43, a cooling device controller 44, a vehicle controller 45, and a measurer 46.

The acquirer 41 acquires the temperature of the battery 52 measured by the battery sensor 54. The acquirer 41 acquires the temperature of the battery 52 after charging of the battery 52 by the external power source 100 is completed. In addition, the acquirer 41 acquires information on the external temperature of the vehicle M (a change in the external temperature) from an external server (not shown) or the like. The acquirer 41 is an example of an "acquirer."

The threshold temperature calculator 42 calculates a threshold temperature for achieving a predetermined target value set for the performance of the battery 52 on the basis of the usage status of the battery 52. In addition, the threshold temperature calculator 42 calculates a threshold temperature such that the average value of the temperature of the battery 52 becomes the target temperature when the battery 52 is used for a predetermined period of time. In addition, the threshold temperature calculator 42 calculates a threshold temperature on the basis of the external temperature of the vehicle M. The target value regarding performance is, for example, maintaining a capacity maintenance rate of the battery 52 at 70% or more after 10 years have passed since the start of use of the battery 52, or the like. The capacity maintenance rate is expressed, for example, by a state of health (SOH). This SOH is a percentage of a fully charged capacity (Ah) of the battery 52 during use (during deterioration) when a fully charged capacity (Ah) of the battery 52 at the initial time is 100%. The threshold temperature calculator 42 is an example of a "calculator."

The charging controller 43 controls charging of the battery 52 by the external power source 100. In addition, in a case in which a charging rate of the low-voltage battery 70 is lower than a threshold charging rate after the cooling device 56 has completed cooling the battery 52, the charging controller 43 charges the low-voltage battery 70 with electric power provided by the battery 52. The charging controller 43 is an example of a "charging controller."

The cooling device controller 44 controls an operation of the cooling device 56 on the basis of a comparison result between the temperature of the battery 52 acquired by the acquirer 41 (the temperature while the battery 52 is being charged, the temperature after charging of the battery 52 is completed, or the temperature when the vehicle Mis activated periodically after charging of the battery 52 is completed) and the threshold temperature. A threshold temperature set as a condition for activating the cooling device after charging of the battery 52 is completed is lower than another threshold temperature during charging set as a condition for activating the cooling device 56 while the battery 52 is being charged. The cooling device controller 44 is an example of a "cooling device controller." The threshold temperature is a fixed temperature for achieving a predetermined target value set for the performance of the battery 52, or a variable temperature calculated by the threshold temperature calculator 42 described above.

The vehicle controller 45 controls the activation of the vehicle M. After charging of the battery 52 by the external power source 100 is completed, the vehicle controller 45 sets the vehicle M to a sleep state, and thereafter activates the vehicle M periodically. The vehicle controller 45 is an example of a "vehicle controller."

The measurer 46 measures the charging rate of the low-voltage battery 70 that supplies electric power to the cooling device 56. The measurer 46 calculates a state of charge (SOC) of the low-voltage battery 70 on the basis of, for example, an output (a current or a voltage) from the low-voltage battery 70.

[Process Flow]

Figure 3:
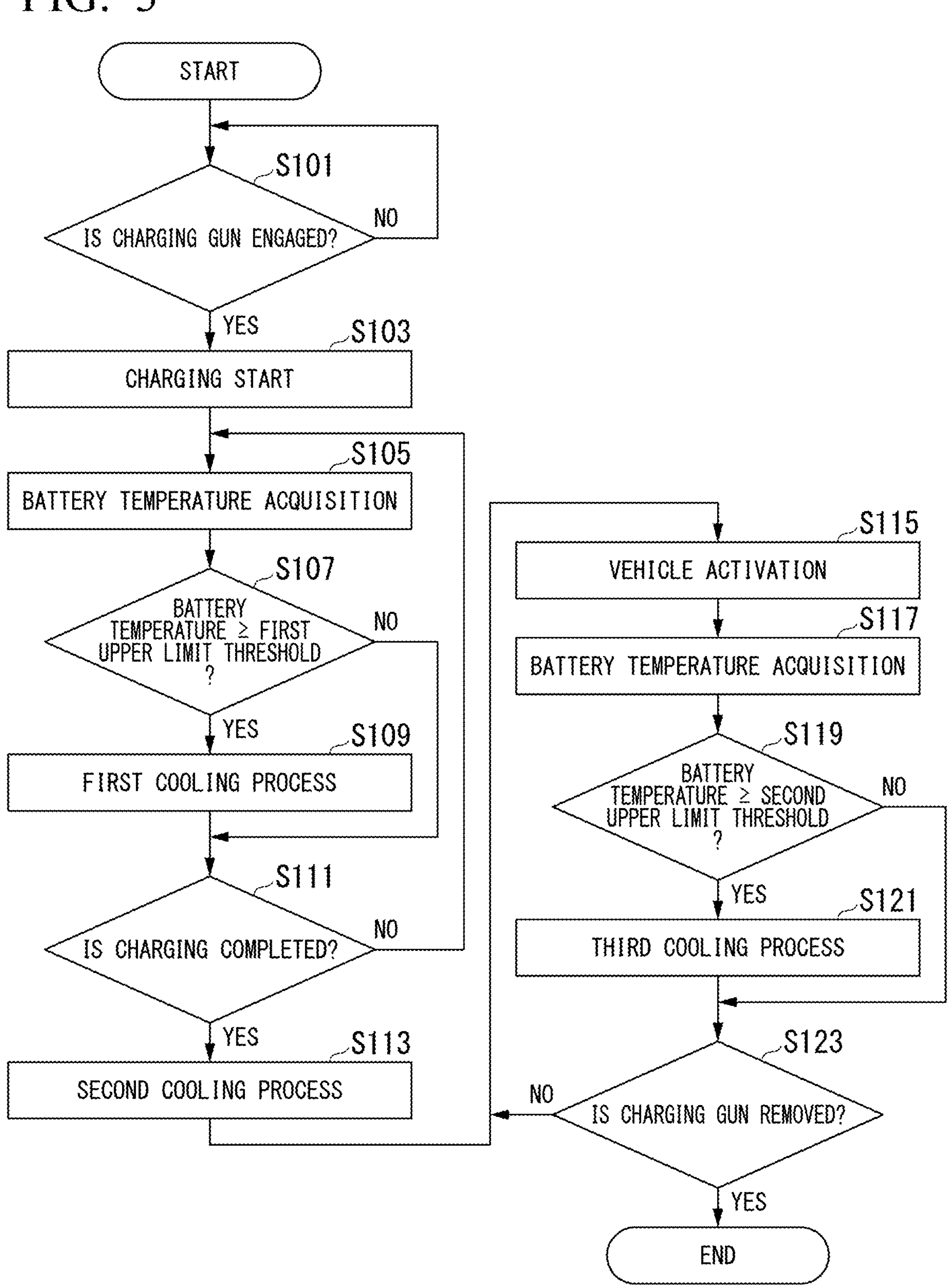
FIG. 3 is a flowchart showing an example of the flow of a charging process executed by the controller 40 according to the embodiment.
Figure 4:
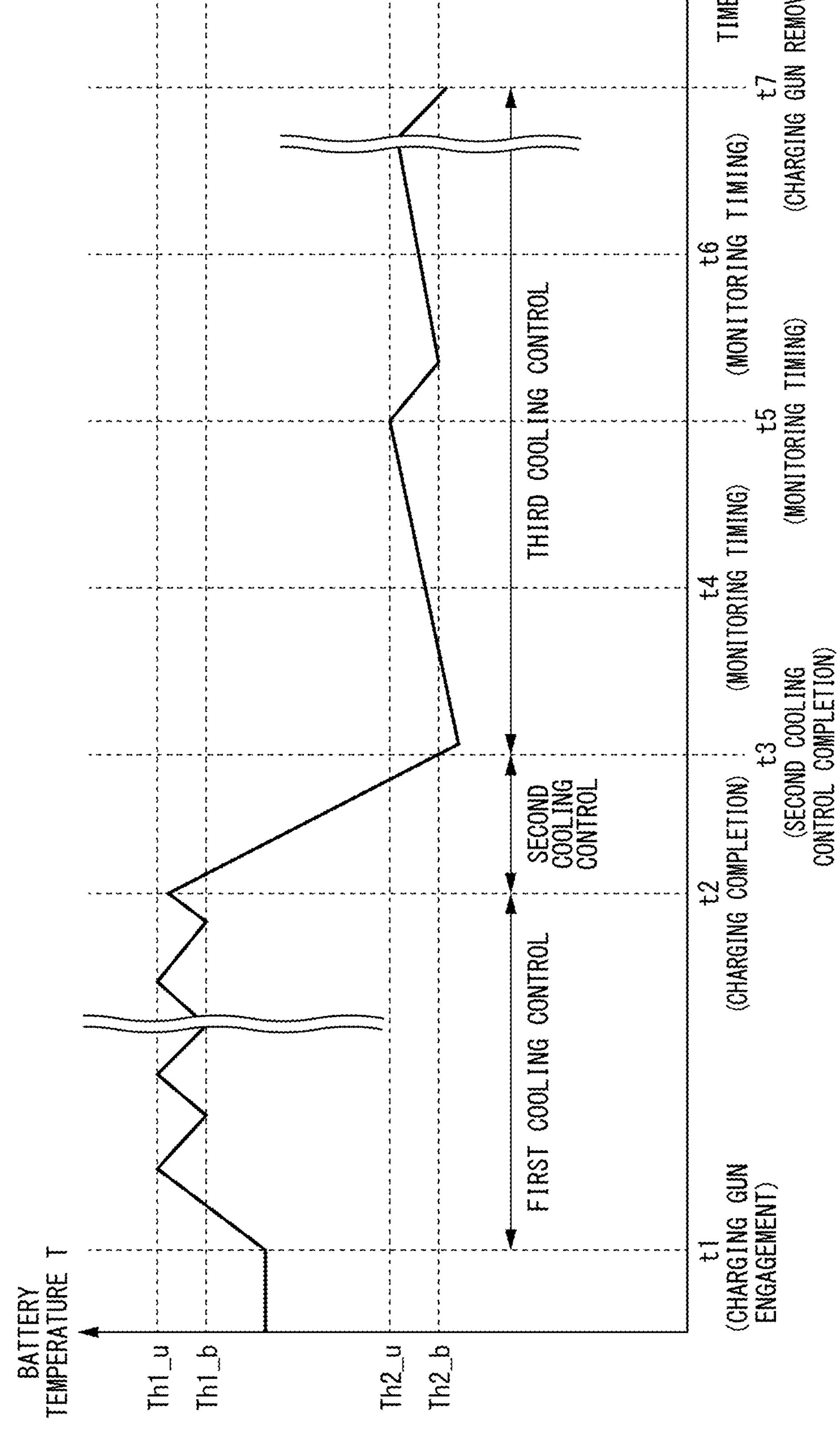
FIG. 4 is a graph showing the change over time of a battery 52 during the charging process according to the embodiment.

Next, an example of a charging process for the battery 52 centered on the operation of the controller 40 will be described. FIG. 3 is a flowchart showing an example of the flow of a charging process executed by the controller 40 according to the embodiment. The process shown in FIG. 3 is started, for example, after an occupant of the vehicle M stops the vehicle M at a facility (of a home, a charging station, or the like) at which the external power source 100 capable of charging the battery 52 is installed, and performs operations to start charging the vehicle M and the external power source 100. FIG. 4 is a graph showing the change over time of the battery 52 during the charging process according to the embodiment.

First, the charging controller 43 determines whether or not the charging gun 102 of the external power source 100 is engaged with the charging port of the vehicle M (step S101). In a case in which it is determined that the charging gun 102 of the external power source 100 is not engaged (step S101: No), the charging controller 43 continues this determination.

On the other hand, in a case in which it is determined that the charging gun 102 of the external power source 100 is engaged (step S101: Yes), the charging controller 43 starts charging the battery 52 (step S103). When charging of the battery 52 starts, a first cooling control is performed under the control of the controller 40. The acquirer 41 acquires the temperature of the battery 52 measured by the battery sensor 54 (step S105). As shown in FIG. 4, after the charging gun 102 of the external power source 100 is engaged with the charging port of the vehicle M at time t1, the temperature of the battery 52 increases as the charging starts.

Next, the cooling device controller 44 determines whether or not the acquired temperature of the battery 52 is equal to or higher than a first upper limit threshold Th1_u (step S107). The first upper limit threshold Th1_u is a temperature that is a condition for activating the cooling device 56 while the battery 52 is being charged. In a case in which the cooling device controller 44 determines that the temperature of the battery 52 is equal to or higher than the first upper limit threshold Th1_u, the cooling device controller 44 activates the cooling device 56 to perform a cooling process (a first cooling process) for the battery 52 (step S109). The first cooling process is intended to improve the charging efficiency (to shorten the charging time) by preventing an excessive increase in temperature of the battery 52 during charging, for example. This first cooling process is continued until the temperature of the battery 52 is decreased to a first lower limit threshold Th1_b (Th1_b<Th1_u).

Next, in a case in which it is determined that the temperature of the battery 52 is not equal to or higher than the first upper limit threshold Th1_u, or while the temperature of the battery 52 is determined to be equal to or higher than the first upper limit threshold Th1 u and the first cooling process is being performed, the charging controller 43 determines whether or not the charging process of the battery 52 has been completed (step S111). For example, the charging controller 43 determines whether or not the battery 52 is fully charged (whether or not the SOC exceeds a threshold). In a case in which it is determined that the charging process of the battery 52 is not completed (step S111: No), the process is returned to step S105, and the subsequent processes are repeated.

On the other hand, in a case in which it is determined that the charging process of the battery 52 is completed (step S111: Yes), the charging controller 43 stops the charging process, and a second cooling control is performed under the control of the controller 40. The cooling device controller 44 changes the operation mode of the cooling device 56 to perform a cooling process (a second cooling process) for the battery 52 (step S113). The second cooling process is intended to prevent a decrease in the performance of the battery 52 (improving its lifetime durability and extending its lifetime) by, for example, quickly decreasing the temperature of the battery 52 immediately after charging. This second cooling process is continued until the temperature of the battery 52 is decreased to a second lower limit threshold Th2_b (Th2_b<Th1_b, Th1_u). As shown in FIG. 4, after it is determined that the charging process of the battery 52 is completed at time t2, the temperature of the battery 52 is gradually decreased due to the second cooling process, and at time t3, the temperature reaches the second lower limit threshold Th2_b, and the second cooling process is completed. After the second cooling process is completed, the vehicle controller 45 sets the vehicle M to a sleep state (an ignition OFF state).

After the second cooling process is completed, the vehicle M becomes a sleep state, but, the temperature of the battery 52 may increase due to the influence of the external air temperature of the vehicle M, or the like. In particular, in summer or in areas where the average annual temperature is high, the temperature of the battery 52 may increase even during this period of time when the battery 52 is left unattended after the charging. Therefore, in the present embodiment, after the second cooling process is completed, a third cooling control is performed under the control of the controller 40. In this third cooling control, the vehicle controller 45 periodically activates the vehicle M (ignition ON) (step S115). The vehicle controller 45 activates the vehicle M at regular monitoring timings such as time t4, time t5, and time t6 shown in FIG. 4. When the vehicle M is periodically activated, the acquirer 41 acquires the temperature of the battery 52 measured by the battery sensor 54 (step S117). Subsequently, the cooling device controller 44 determines whether or not the acquired temperature of the battery 52 is equal to or higher than a second upper limit threshold Th2_u (step S119). The second upper limit threshold Th2_u is a temperature that is a condition for activating the cooling device 56 during the period of time when the battery 52 is left unattended after the charging. In a case in which the cooling device controller 44 determines that the temperature of the battery 52 is equal to or higher than the second upper limit threshold Th2_u, the cooling device controller 44 activates the cooling device 56 to perform a cooling process (a third cooling process) for the battery 52 (step S121). The third cooling process is intended to prevent a decrease in the performance of the battery 52 (improving its lifetime durability and extending its lifetime) by, for example, preventing an increase in the temperature of the battery 52 during the period of time when the battery 52 is left unattended after the charging. This third cooling process is continued until the temperature of the battery 52 is decreased to the second lower limit threshold Th2_b (Th2_b<Th2_u). In the example shown in FIG. 4, at time t5, the temperature of the battery 52 reaches the second upper limit threshold Th2_u, and then the third cooling process is performed, and the temperature of the battery 52 is decreased to the second lower limit threshold Th2_b.

Next, in a case in which it is determined that the temperature of the battery 52 is not equal to or higher than the second upper limit threshold Th2_u, or while the temperature of the battery 52 is determined to be equal to or higher than the second upper limit threshold Th2_u and the third cooling process is being performed, the charging controller 43 determines whether or not the charging gun 102 has been removed (step S123). In a case in which it is determined that the charging gun 102 has not been removed (step S123: No), the charging controller 43 again sets the vehicle M to a sleep state (an ignition OFF state), returns the process to step S115, periodically activates the vehicle M, and the subsequent processes are repeated. On the other hand, in a case in which it is determined that the charging gun 102 has been removed (step S123: Yes, time t7 in the example shown in FIG. 4), the process of the present flowchart ends.

In the above, the case in which the second upper limit threshold Th2_u and the second lower limit threshold Th2_b, which are the conditions for activating and stopping the cooling device 56 during the period of time when the battery 52 is left unattended after the charging in the third cooling control, are fixed values was explained as an example. However, the second upper limit threshold Th2_u and the second lower limit threshold Th2_b may be variable values calculated according to the environment in which the battery 52 is placed (the external temperature).

Figure 5:
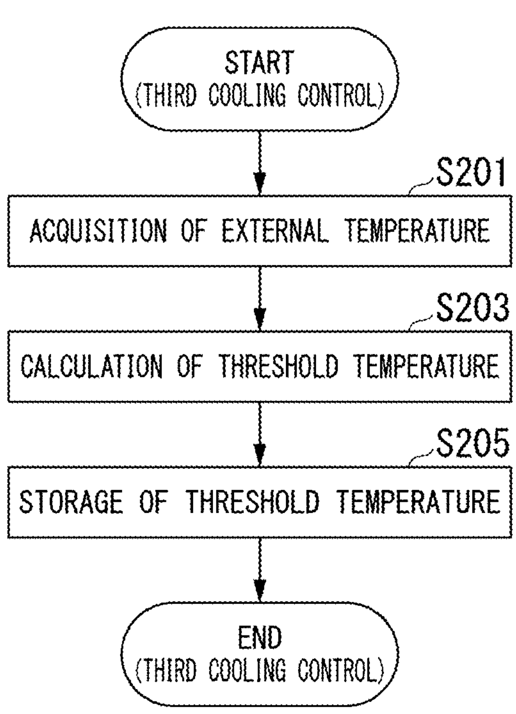
FIG. 5 is a flowchart showing an example of the flow of a process for calculating threshold temperatures in a third cooling control executed by the controller 40 according to the embodiment.

FIG. 5 is a flowchart showing an example of the flow of a process for calculating the threshold temperatures in the third cooling control executed by the controller 40 according to the embodiment. In addition, the acquirer 41 acquires information on the external temperature of the vehicle M from the external server (not shown) or the like (step S201). The information on the external temperature may include the current external temperature as well as a predicted value of a change in the future external temperature.

Next, the threshold temperature calculator 42 calculates the threshold temperatures (the second upper limit threshold Th2_u and the second lower limit threshold Th2_b) for achieving a predetermined target value set for the performance of the battery 52 on the basis of the acquired information on the external temperature (step S203). For example, the threshold temperature calculator 42 calculates the threshold temperature such that the capacity maintenance rate of the battery 52 can be maintained at 70% or more after 10 years has passed since the start of use the battery 52 (for example, such that the average value of the lifetime temperature is 27 degrees). The threshold temperature calculator 42 calculates the threshold temperature on the basis of historical information on the past temperature of the battery 52 (usage information of the battery 52) stored in the memory of the vehicle M and the information on the external temperature. The threshold temperature calculator 42 calculates the threshold temperature using reference information stored in the memory of the vehicle M which indicates the relationship between the usage temperature and the capacity maintenance rate of the battery.

Next, the threshold temperature calculator 42 stores the calculated threshold temperatures (the second upper limit threshold Th2_u and the second lower limit threshold Th2_b) in the memory of the vehicle M (step S205). Thereafter, the cooling device controller 44 compares the temperature of the battery 52 with the threshold temperatures (the second upper limit threshold Th2_u and the second lower limit threshold Th2_b) to perform the third cooling control.

According to the present embodiment described above, the temperature after charging of the battery by an external power source is completed is acquired, and the operation of the cooling device is controlled on the basis of the comparison result between the acquired temperature and a threshold temperature set as a condition for activating the cooling device after charging of the battery is completed. This makes it possible to control the temperature of the battery after charging of the battery is completed, suppress battery deterioration, and ultimately extend the lifetime of the battery.

Although forms for carrying out the present invention have been described above using the embodiments, the present invention is not limited to these embodiments, and various modifications and substitutions can be made without departing from the gist of the present invention.

What is claimed is:

1. A control device for a vehicle that comprises a rotating electric machine for driving the vehicle, a power storage device configured to transmit and receive electric power to and from the rotating electric machine, and a cooling device configured to cool the power storage device, wherein the control device comprises a processor configured to execute a program to:

acquire a temperature of the power storage device during a post-charging period in which charging by an external power source has been terminated and no charging current is supplied to the power storage device, the post-charging period being a period in which the vehicle is in a sleep state; and control an operation of the cooling device based on a comparison between the acquired temperature and a post-charging threshold temperature that is defined for the post-charging period, and wherein the post-charging threshold temperature is lower than a charging-period threshold temperature that is used while charging current is being supplied to the power storage device.

2. The control device according to claim 1, wherein the threshold temperature is a fixed temperature for achieving a predetermined target value set for performance of the power storage device.

3. The control device according to claim 1, wherein the processor is further configured to execute the program to calculate the threshold temperature for achieving a predetermined target value set for performance of the power storage device.

4. The control device according to claim 3, wherein the processor is further configured to execute the program to calculate the threshold temperature to make an average value of the temperature of the power storage device be a target temperature when the power storage device is used for a predetermined period of time.

5. The control device according to claim 3, wherein the processor is further configured to execute the program to:

acquire an external temperature of the vehicle; and calculate the threshold temperature on a basis of the acquired external temperature of the vehicle.

6. The control device according to claim 1, wherein the processor is further configured to execute the program to:

set the vehicle to a sleep state after charging of the power storage device is completed and then activate the vehicle periodically; and control an operation of the cooling device on a basis of a comparison result between a temperature of the power storage device acquired when the vehicle is periodically activated and the threshold temperature.

7. The control device according to claim 1, wherein the processor is further configured to execute the program to control charging of the power storage device by the external power source.

8. The control device according to claim 7, wherein the processor is further configured to execute the program:

measure a charging rate of a second power storage device configured to supply electric power to the cooling device; and charge the second power storage device with the electric power that is provided by the power storage device in a case in which the charging rate of the second power storage device is lower than a threshold charging rate after the cooling device completes cooling of the power storage device after charging of the power storage device is completed.

9. A control method for a vehicle that comprises a rotating electric machine for driving the vehicle, a power storage device configured to transmit and receive electric power to and from the rotating electric machine, and a cooling device configured to cool the power storage device, wherein the control method comprises:

acquiring, by a computer, a temperature of the power storage device during a post-charging period in which charging by an external power source has been terminated and no charging current is supplied to the power storage device, the post-charging period being a period in which the vehicle is in a sleep state; and controlling, by the computer, an operation of the cooling device based on a comparison between the acquired temperature and a post-charging threshold temperature that is defined for the post charging period, wherein the post-charging threshold temperature is lower than a charging-period threshold temperature that is used while charging current is being supplied to the power storage device.

10. The control method according to claim 9, further comprises:

acquiring, by the computer, an external temperature of the vehicle; and calculating, by the computer, the threshold temperature on a basis of the acquired external temperature of the vehicle.

* * * * *